United States Patent [19]

Schumacher, II et al.

[11] Patent Number: 4,813,291
[45] Date of Patent: Mar. 21, 1989

[54] DRIVE MECHANISM FOR MOWING KNIVES OF HARVESTING MACHINES

[76] Inventors: Gustav Schumacher, II, Gartenstrasse 8; Günter Schumacher, Raiffeisenstrasse 10, both of Eichelhardt, Fed. Rep. of Germany

[21] Appl. No.: 46,585

[22] Filed: May 4, 1987

[30] Foreign Application Priority Data

May 3, 1986 [DE] Fed. Rep. of Germany ....... 3615058

[51] Int. Cl.4 .................. F16H 37/12; F16H 1/28; F16C 35/063
[52] U.S. Cl. ........................... 74/52; 74/803; 384/434
[58] Field of Search .............. 74/52; 384/428, 434, 384/438

[56] References Cited

U.S. PATENT DOCUMENTS

| 2,541,324 | 2/1951 | Baxter et al. | 74/52 |
| 2,736,203 | 2/1956 | Shore | 74/52 |
| 2,841,454 | 7/1958 | Cheramie | 384/428 |
| 3,288,095 | 11/1966 | Ballo | 74/52 |
| 3,651,707 | 3/1972 | Rees | 384/438 |
| 4,513,674 | 4/1985 | Bhatia et al. | 74/52 |

FOREIGN PATENT DOCUMENTS

| 220428 | 9/1958 | Australia | 384/434 |
| 3427503 | 3/1986 | Fed. Rep. of Germany . | |
| 3525576 | 1/1987 | Fed. Rep. of Germany . | |
| 829172 | 6/1938 | France | 74/52 |
| 937850 | 6/1982 | U.S.S.R. | 74/52 |

Primary Examiner—Allan D. Herrmann
Attorney, Agent, or Firm—Steinberg & Raskin

[57] ABSTRACT

The invention relates to a drive mechanism for mowing knives moving to and fro on harvesting machines, with a rotor which rotates in a housing and on which a planet wheel has a double mounting, this planet wheel rolling in a fixed inner toothed ring and being connected to a crank, the diameter of the planet wheel corresponding to the radius of the inner toothed ring and the radius of the planet wheel corresponding to the radius of the crank, and the planet-wheel bearing located furthest away in the housing being mounted on the rotor by means of a releasable bearing holder.

19 Claims, 4 Drawing Sheets

DRIVE MECHANISM FOR MOWING KNIVES OF HARVESTING MACHINES

BACKGROUND OF THE INVENTION

The invention relates to a drive mechanism for mowing knives moving to and fro on harvesting machines.

There is a wide variety of designs of knife drives of this type. The simplest is a crank which converts a rotary movement into an oscillating movement via a crank arm or connecting rod. For reasons of space, this type cannot be used on self-propelled working machines, such as, for example, a combine-harvester.

To make it possible to have a narrower overall size, on these machines the crank mechanism is often deflected through 90° via a rocker.

For other constructions, it is preferable to use swashplate bearings, the wobbling motion of which generates oscillating movements via a swashplate shaft moving to and fro at right angles to the wobble axis, and via levers which are fastened, in turn, to this swashplate shaft. The disadvantage of all these constructions is that the transmission of force to the mowing knife is not exactly linear. Each rocker and each lever of the types of drive described execute a radial movement about their centre of rotation. The longer the particular lever, the smaller the radial movement, but the higher the torque which is exerted on the centre of rotation when the knife is subjected to load. The smaller the radial movement, the longer the lever arm. The longer the lever arm, the higher the torque. The higher the torque, the stronger and heavier the drive elements must be. These in turn are the more costly, the more sturdy they are, and more weight, space and material are required for them. Drives of this type are, from the outset, only suitable for as short a stroke of the mowing knife as possible.

A much more favourable possibility is afforded by a drive mechanism which is similar to a planet gear and in which a planet wheel rolls in a fixed inner toothed ring, this planet wheel being mounted on a rotor, and a crank being coupled to the planet wheel. The radius of the inner toothed ring and the rolling-circle diameter of the planet wheel are of equal size. The radius of the rolling circle of the planet wheel is, in turn, equal to the radius of the crank which is connected operatively to the planet wheel.

As a result of the constructive design, the crank-pin executes an absolutely straight to-and-fro movement during each revolution of the rotor. This linear movement thus corresponds exactly to the diameter of the rolling circle of the inner toothed ring or to double the diameter of the planet wheel or to four times the radius of the crank connected to the planet wheel.

Consequently, the larger the inner toothed ring and planet wheel are made, the greater the stroke to be executed by the mowing knife.

Because of the very wide cutting mechanisms customary at the present time, with correspondingly long and heavy mowing knives, the associated vibrations of the knives moving to and fro restrict the number of strokes. If the length of stroke is increased, together with a greater number of cuts because a particular blade runs over more than one opposing cutting edge, the number of load alternations can be reduced sharply, without a reduction in the mowing capacity. If, for example, the stroke length is double, the number of strokes can be halved, but the cutting capacity nevertheless remains the same.

However, the mechanisms known hitherto, with a fixed inner toothed ring and a planet wheel, have a very wide and high overall size, especially when a long stroke is to be executed. On the one hand, the toothed ring has to be fastened in a housing, thus necessitating a correspondingly large housing, and on the other hand the planet wheel has a double mounting in the rotor, with the result that the rotor bearing has to have a very large diameter because the mounting of the planet-wheel shaft requires a correspondingly large rotor diameter. Bearings of this type are very expensive. In the constructions described, the mounting of the planet wheel and the connecting elements between the planet wheel and the crankpin also involve a very high outlay. Moreover, the assembly and dismantling of this type of mechanism are very complicated and entail a great amount of work.

The patent application No. P 34 27 503.7 already described such a drive mechanism for the mowing knives of harvesting machines, in which the planet wheel is mounted on a bracket attached to the rotor.

The patent application No. P 35 25 576.5 proposed mounting the planet wheel on a bracket by means of an inner bearing and in a bore of the rotor by means of an outer bearing, in order thereby, on the one hand, to make the distance between the two bearings of the planet wheel as long as possible and consequently the stability of this mounting as high as possible and, on the other hand, to keep the bearing of the rotor as small as possible for reasons of cost.

SUMMARY OF THE INVENTION

Starting from this state of the art, the object of the present invention is now to improve further the stability and consequently service life of the mechanism and, in particular, arrange the two bearings of the planet wheel as far apart from one another as possible and give them sufficiently large dimensions, without at the same time having to allow for the disadvantages of too large a rotor bearing.

According to the invnetion, this object is achieved by means of a drive mechanism for mowing knives moving to and fro on harvesting machines, with a rotor which rotates in a housing and on which a planet wheel has a double mounting, this planet wheel rolling in a fixed inner toothed ring and being connected to a crank, and the diameter of the planet wheel corresponding to the radius of the inner toothed ring and the radius of the planet wheel corresponding to the radius of the crank, this drive mechanism being characterized, according to the invention, in that the planet-wheel bearing located furthest away in the housing is mounted on the rotor by means of a releasable bearing holder.

During assembly, such a design according to the invention makes it possible to guide the rotor and the planet wheel mounted on it through the rotor bearing in succession, then fasten the planet-wheel bearing to the rotor and finally insert the unit so formed into the mechanism housing. At the same time, the diameter of the rotor bearing can be kept relatively small, this having a beneficial effect on cost.

It has also proved highly advantageous if, particularly on account of the crank provided on the planet wheel, the planet-wheel bearing facing the crank receptacle is also mounted on the rotor by means of a releasable bearing holder.

To simplify assembly, on the one hand, and to obtain an absolutely secure bearing fastening, on the other hand, it has proved expedient, according to a further advantageous embodiment of the present invention, if the bearing or bearings are fixed in a profiled recess in the rotor and are fastened by means of the bearing holder.

Such a profiled recess, particularly where series production is concerned, ensures constantly exact positioning of the bearing or bearings of the planet wheel on the rotor, without special assembly measures having to be taken for this.

Such a profiling can consist, for example, of longitudinal grooves which are made in the rotor, on the one hand, and in the outer periphery of the bearing of the planet wheel, on the other hand, and which can be engaged with one another. Another possibility is to equip the rotor with a recess which matches the outer periphery of the bearing of the planet wheel and into which the bearing is inserted and then retained by means of the bearing holder. For this purpose, the latter can be screwed onto the rotor so as to surround the planet-wheel bearing in the manner of a flange, or else the bearing holder can be pushed onto the rotor and planet-wheel bearing in the axial direction and fastened in this way.

In any event, the profiling provided between the plant-wheel bearing and the rotor ensures the exact positioning of the bearing on the rotor and consequently accurate fastening without the need for difficult assembly measures.

Either the bearing holder can be fastened by means of screws extending transversely relative to the rotor axis and screwed into the rotor, or it can be connected to the rotor by means of screws extending in the axial direction.

According to another advantageous embodiment of the present invention, the planet-wheel bearing is mounted firmly in the bearing holder itself and is screwed onto the rotor by means of this holder.

Such an embodiment provides the possibility of attaching the bearing of the planet wheel in the bearing holder even before assembly, so that, during assembly, it is merely necessary to screw the bearing holder, together with the bearing arranged in it, onto the rotor, if appropriate by means of adjusting pins.

Such an embodiment proves particularly advantageous, especially from the point of view of assembly.

BRIEF DESCRIPTION OF THE DRAWINGS

The invention is explained in detail below by means of the exemplary embodiments illustrated in the drawings.

In the drawings.

Figure 1:
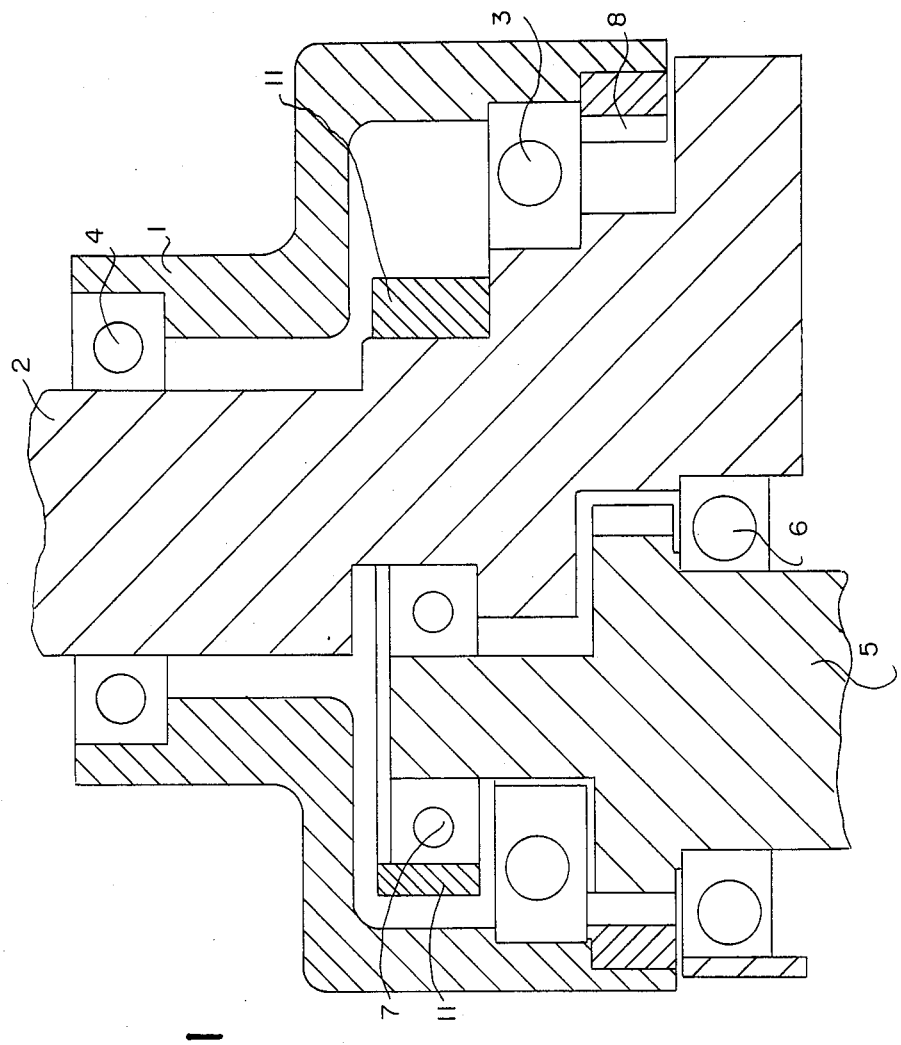
FIG. 1 shows a diagrammatic representation of the mechanism according to the invention, in the form of a longitudinal section.

In the mechanism illustrated diagrammatically in section in FIG. 1, the rotor 2 is mounted rotatably in the housing 1 by means of the lower bearing 3 and the upper bearing 4. In turn, the planet wheel 5 is mounted rotatably in the rotor 2 by means of the lower bearing 6 and the upper bearing 7. The planet wheel 5 is connected operatively, by means of its teeth, to the inner toothed ring 8 which is fixed in the housing 1. The diameter of the planet wheel 5 corresponds to the radius of the inner toothed ring 8. Connected to the planet wheel 5 is a crank, although for the sake of simplicity this is not shown in particular detail.

To obtain the necessary stability, the planet-wheel bearing 7 located furthest away in the housing must be arranged as far apart as possible from the second bearing 6 of the planet wheel 5 and appropriately above the rotor bearing 3.

However, if the bearing receptacle for the bearing 7 is made in one piece with the rotor 2, it is not possible to mount the rotor bearing 3 in the place shown, unless its inside diameter is so large that this bearing can be pushed over the bearing seat of the bearing 7. But, in this case, the rotor bearing 3 would also have a very much larger outside diameter, so that the housing 1 would have to have substantially greater dimensions, and in addition the costs of the rotor bearing 3 would be increased many times.

In contrast to this, in the embodiment according to the invention, after the bearing 3 has been drawn onto the rotor 2, a bearing holder 11 is drawn onto this rotor. The bearing 7 is thereby fixed partly on the rotor itself and partly in the bearing holder 11. The bearing holder 11 is fixed to the rotor 2 by means of the bearing 7 as a result of the interaction resulting from this.

Figure 2:
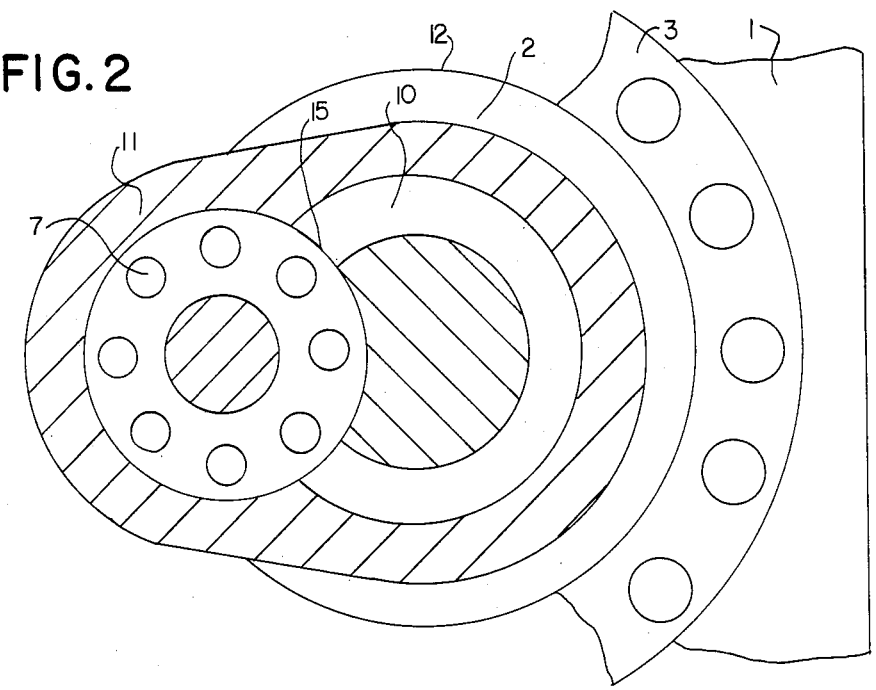
FIG. 2 shows a cross-section through an exemplary embodiment of the bearing holder for the planet-wheel bearing attached furthest away in the housing.

FIG. 2 shows this type of bearing fastening in cross-sectional form. The annular seat 10 of the rotor 2 has a crescent-shaped recess 15 corresponding to the size of the bearing 7. The bearing holder 11 is provided with a bore socket corresponding to the size of the annular seat 10.

During assembly, the rotor bearing 3 is drawn over the mount 12 of the rotor 2, and the bearing holder 11 is then pressed onto the annular seat 10 of the rotor by means of the bearing 7. As a result, the bearing 7 is fixed exactly and immovably on the rotor in the crescent-shaped recess 15, while on the other hand the bearing holder 11 is also fixed immovably by means of the bearing 7.

The same type of bearing mounting can also be used for the bearing 6 of the planet wheel 5. Since the constructive design corresponds to that described for the upper bearing 7, there is no need for a detailed drawing illustration of this embodiment.

Figure 3:
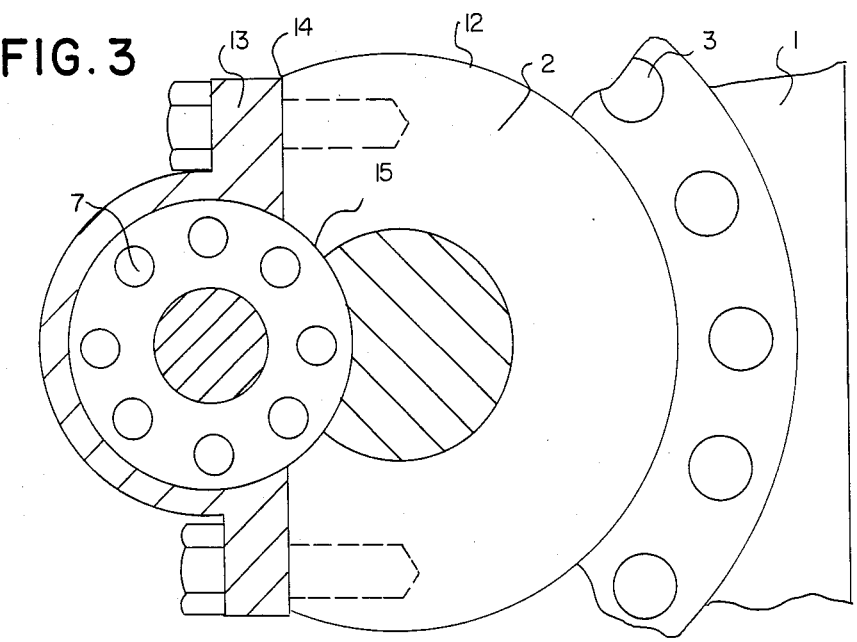
FIG. 3 shows a further exemplary embodiment of the bearing holder for fastening the planet-wheel bearing to the rotor.

FIG. 3 shows a further exemplary embodiment of the releasable bearing holder on the rotor. Here, the holder is designed in the manner of a clamping yoke which is screwed laterally to the rotor by means of screws extending transversely relative to the rotor axis. During assembly, the bearing 3 is first drawn over the seat 12 and the yoke 13, together with the bearing 7, is screwed to the lateral surface 14 of the rotor. In this embodiment too, fastening takes place as a result of the interaction of the clamping yoke 13, the bearing 7 and a crescent-shaped recess 15 in the rotor.

The bearing 6 can be fastened to the rotor 2 in virtually the same way by means of a similar clamping yoke.

Figure 4:
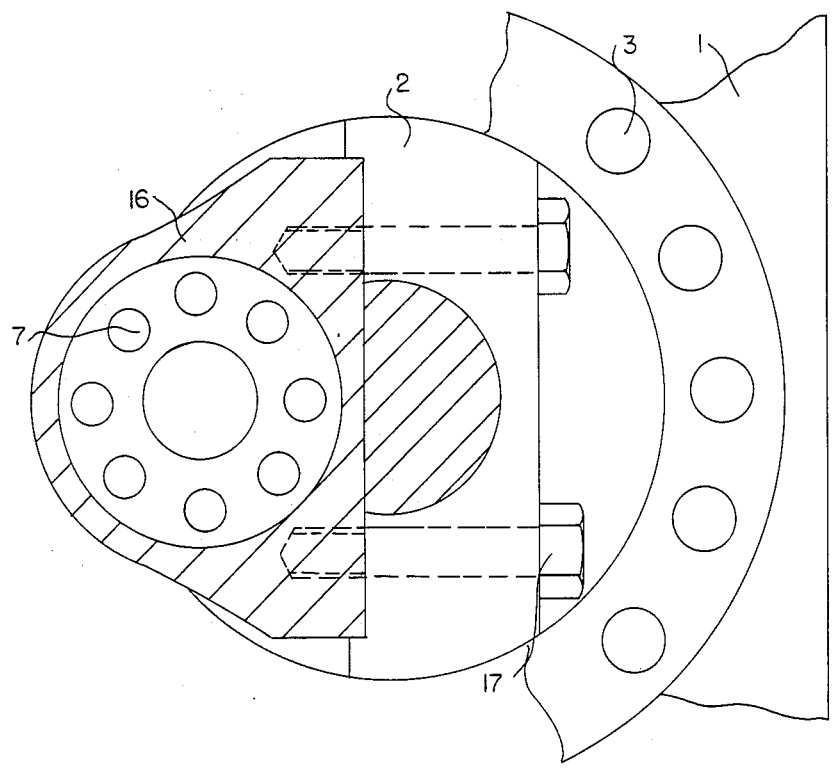
FIG. 4 shows another exemplary embodiment of the bearing holder for fastening the planet-wheel bearing to the rotor.

In the exemplary embodiment shown in FIG. 4, the bearing 7 is pressed in a special bearing block 16, and the bearing block 16 is flanged laterally to the rotor 2 by means of the screws 17 guided through the rotor 2.

Figure 5:
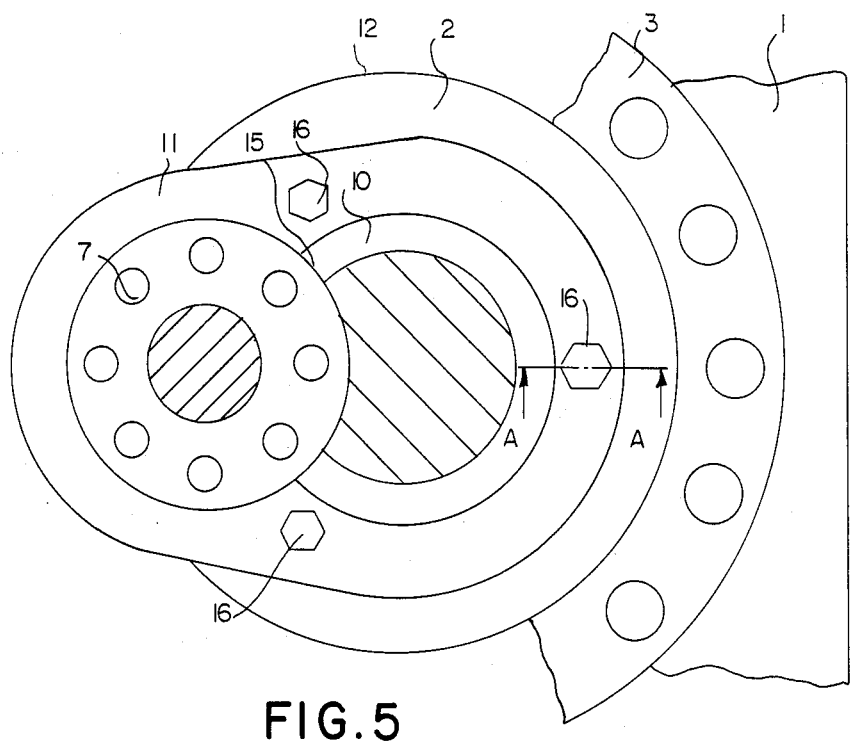
FIG. 5 is a view similar to FIG. 2, and illustrating a further alternative embodiment for fastening the planet-wheel bearing to the rotor.
Figure 6:
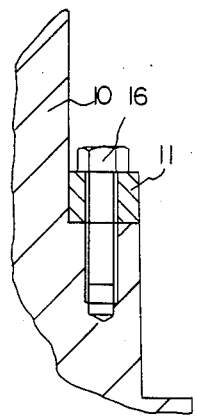
FIG. 6 is a sectional view along line A—A of FIG. 5.

Alternatively, the bearing holder 11 can be connected to the rotor 2 by means of screws 16 extending in the axial direction (FIGS. 5 and 6).

We claim:

1. Drive mechanism for mowing knives moving to and fro on harvesting machines, with a rotor which rotates in a housing and on which a planet wheel has a double mounting, this planet wheel rolling in a fixed inner toothed ring and being connected to a crank, and the diameter of the planet wheel substantially corresponding to the radius of the inner toothed ring and the radius of the planet wheel substantially corresponding to the radius of the crank, wherein a bearing (7) of the planet wheel (5) located furthest in the housing is mounted on the rotor (2) by means of a releasable bearing holder (11, 13 or 16).

2. Drive mechanism according to claim 1, wherein a bearing (6) of the planet wheel (5) which faces the crank is also mounted on the rotor (2) by means of a releasable bearing holder.

3. Drive mechanism according to claim 1, wherein the bearing (7) is fixed in a profiled recess (15) in the rotor (2) and is fastened by means of the bearing holder (11).

4. Drive mechanism according to claim 3, wherein the bearing holer (11) is pushed onto the rotor and the planet-wheel bearing in the axial direction and fastened.

5. Drive mechanism according to claim 3, wherein the bearing holder (16) is screwed onto the rotor (2) so as to surround the planet-wheel bearing (7) in the manner of a flange.

6. Drive mechanism according to claim 3, wherein the planet-wheel bearing (7) is mounted in the bearing holder (13) and is screwed together with the same onto the rotor (2).

7. Drive mechanism according to claim 5, wherein the bearing holder (13) is screwed onto the rotor (2) by means of screws extending substantially transversely relative to the rotor axis.

8. Drive mechanism according to claim 4, wherein the bearing holder (11) is screwed onto the rotor (2) by means of screws extending substantially in the axial direction.

9. The drive mechanism of claim 2, wherein the bearings (6,7) are fixed in a profiled recess (15) and the rotor (2) and are fastened by means of the bearing holder (11).

10. The drive mechanism of claim 6, wherein the bearing holder (16) is screwed onto the rotor (2) by means of screws extending substantially transversely relative to the rotor axis.

11. The drive mechanism of claim 1, wherein the rotor (2) is rotatably mounted upon the housing (1) through a bearing (3) that is positioned between said toothed ring (8) and planet wheel bearing (7) in an axial direction of the rotor (2).

12. The drive mechanism of claim 2, wherein the rotor (2) is rotatably mounted upon the housing (1) through a bearing (3) that is positioned between said two planet wheel bearings (6,7) in an axial direction of the rotor (2).

13. The drive mechanism of claim 3, wherein said profiled recess (15) comprises longitudinal grooving.

14. The drive mechanism of claim 1, wherein the bearing holder (11) is provided with a bore socket substantially corresponding to size of an annular seat (10) of the rotor (2).

15. Drive mechanism for mowing knives moving to and fro on harvesting machines, with a rotor which rotates in a housing and on which a planet wheel has a double mounting, this planet wheel rolling in a fixed inner toothed ring and being connected to a crank, and the diameter of the planet wheel substantially corresponding to the radius of the inner toothed ring and the radius of the planet wheel substantially corresponding to the radius of the crank, wherein a bearing holder (11) is provided for mounting at least one of two bearings (6,7) and peripherally surrounds the rotor (2) and said at least one bearing, said bearing holder (11) being fixed to the rotor (2), and a substantially circular segment of said at least one bearing being located in a respective recess (15) formed in said rotor (2) and a remaining segmental portion of said at least one bearing being located in the bearing holder (11), whereby radial positioning of said at least one bearing and bearing holder (11) at the rotor (2) is effected.

16. The drive mechanism of claim 15, wherein an inner bearing (7) of the planet wheel (5) is mounted upon the bearing holder (11).

17. The drive mechanism of claim 15, wherein an outer bearing (6) of the planet wheel (5) is mounted upon the bearing holder (11).

18. The drive mechanism of claim 15, wherein the bearing holder (11) is screwed onto the rotor (2) by means of screws substantially extending in an axial direction of the rotor (2).

19. Drive mechanism for mowing knives moving to and fro on harvesting machines, with a rotor which rotates in a housing and on which a planet wheel has a double mounting, said planet wheel rolling in a fixed inner toothed ring and being connected to a crank, and the diameter of the planet wheel substantially corresponding to the radius of the inner toothed ring and the radius of the planet wheel substantially corresponding to the radius of the crank, wherein at least one of two bearings (6,7) of a shaft of the planet wheel (15) is fixed upon the rotor (2) by means of a bearing holder (11) pushed in an axial direction onto the rotor shaft (2), with a substantially circular segment of the at least one bearing located in a corresponding recess (15) of the rotor (2) and a remaining substantially circular segment of the at least one bearing being positioned in the bearing holder (11).

* * * * *